G. H. SPENCER.

Improvement in Spring Wagon-Seats.

No. 131,716. Patented Sep. 24, 1872.

WITNESSES:

INVENTOR:
Geo H Spencer
By his atty's.
Howson and Son

UNITED STATES PATENT OFFICE.

GEORGE HARRISON SPENCER, OF HUDSON CITY, NEW JERSEY.

IMPROVEMENT IN SPRING WAGON-SEATS.

Specification forming part of Letters Patent No. 131,716, dated September 24, 1872.

*To all whom it may concern:*

Be it known that I, GEORGE HARRISON SPENCER, of Hudson City, county of Hudson, State of New Jersey, have invented an Improvement in Spring Wagon-Seats, of which the following is a specification:

My invention relates to a device for supporting the seats of wagons, &c.; and consists of a bracket, a sliding frame connected to the bracket, and a spring supporting the said frame, as fully described hereafter. My invention further consists of the combination, with the said sliding frame, of a seat hinged to the frame, so that it can be readily turned out of the way when bulky objects are to be carried.

Figure 1:
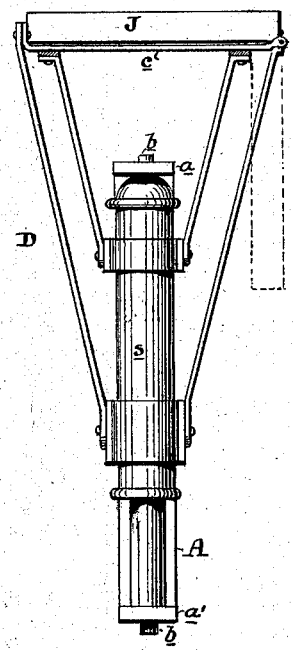
Figure 2:
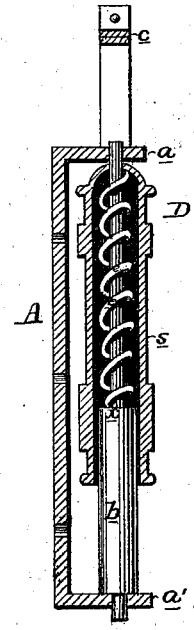
Figure 5:
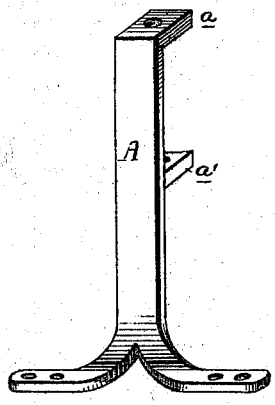

In the drawing, Figure 1 is a side elevation of my improved spring-support for wagon-seats; Fig. 2, a vertical section; and Fig. 3, a modification.

A is a metal bracket, through a projection, $a$, at the upper end of which extends a rod, $b$, the lower square end of the latter fitting a socket in a projection, $a'$. The rod extends through an opening in the upper end of a case, $s$, which incloses the upper portion of the rod, and is connected to or forms part of a frame, D, the frame sliding on the rod $b$ and resting on a spring, $e$, coiled within the case and bearing on a shoulder, $x$, on the rod. In the bracket A are openings for the passage of bolts, by which the bracket may be firmly secured to the side of a vehicle, a similar bracket, carrying another frame, being secured to the other side, and on the cross-pieces $c$ of the frames rests a seat, J.

The seat may be detachable; but in the present instance is shown as hinged to the ends of the cross-pieces $c$, so that it may be turned to the position shown in dotted lines to be out of the way when bulky articles are placed in the vehicle. The springs $e$ effectually neutralize or absorb the jolts or jars occasioned by driving over rough roads or streets, but are sufficiently rigid to sustain any weight that may be placed upon the seat. The spring $e$ does not bear laterally upon the stationary rod $b$, but is supported by the sides of the case. By this arrangement much friction and wear are avoided, as the case, instead of sliding upon the spring, descends and rises with the latter as it is compressed and expands, so that there is little or no abrasion of either. The spring also maintains the lower end of the rod in its socket without any other fastening, but does not prevent the rod, on the application of sufficient force, from being raised and detached when the frame is to be removed.

The frame may be of any suitable form, and in place of the casing A a lug on the frame may bear upon the spring $e$. The bracket, instead of being constructed so as to be attached to the side of the vehicle, may be of the form shown in Fig. 3, so as to rest on and be secured to the bottom; and, in place of the spring of coiled wire, a rubber spring may be used.

I claim as my invention—

1. The combination, with the bracket A and rod $b$, of the sliding frame D and spring $e$, substantially as and for the purpose set forth.

2. The combination, with the bracket A, of the detachable rod $b$ fitted to a socket and maintained therein by a spring which supports the sliding frame.

3. The combination, with the bracket A and sliding frame, of a spring, $e$, so arranged as to move with the frame, as and for the purpose set forth.

In testimony whereof I have signed my name to this specification in the presence of two subscribing witnesses.

G. H. SPENCER.

Witnesses:
  A. H. NORRIS,
  CHARLES V. FOSTER.